(12) United States Patent
Dendl et al.

(10) Patent No.: US 8,095,433 B2
(45) Date of Patent: Jan. 10, 2012

(54) METHOD AND COMPUTER STORAGE MEDIUM FOR ORDERING A REPLACEMENT KIT TO BUILD SUPERSEDED PARTS

(75) Inventors: Stefan Dendl, Kaiserslautern (DE); Adam Stollarski, Tokyo (JP); Hans-Ulrich Von Helmolt, Heidelberg (DE); Wolfram Schick, Karlsruhe (DE); Carsten Kreuels, Contwig (DE)

(73) Assignee: SAP AG, Walldorf (DE)

( * ) Notice: Subject to any disclaimer, the term of this patent is extended or adjusted under 35 U.S.C. 154(b) by 1394 days.

(21) Appl. No.: 11/063,433

(22) Filed: Feb. 22, 2005

(65) Prior Publication Data

US 2006/0190342 A1 Aug. 24, 2006

(51) Int. Cl.
G06Q 30/00 (2006.01)
G06Q 10/00 (2006.01)
G06F 17/50 (2006.01)
A01K 5/02 (2006.01)

(52) U.S. Cl. ............... 705/26.8; 705/26.1; 705/26.5; 705/28; 705/29

(58) Field of Classification Search ............... 705/26.1, 705/26.5, 26.8, 28, 29
See application file for complete search history.

(56) References Cited

U.S. PATENT DOCUMENTS

| | | | |
|---|---|---|---|
| 6,820,038 B1* | 11/2004 | Wetzer et al. | 702/184 |
| 6,856,968 B2* | 2/2005 | Cooley et al. | 705/28 |
| 7,099,731 B2* | 8/2006 | Lopez | 700/117 |
| 7,233,914 B1* | 6/2007 | Wijaya et al. | 705/26 |
| 7,343,212 B1* | 3/2008 | Brearley et al. | 700/106 |
| 7,461,008 B2* | 12/2008 | Garrow et al. | 705/8 |
| 2002/0004761 A1* | 1/2002 | Sekitani | 705/26 |
| 2002/0065764 A1* | 5/2002 | Brodersen et al. | 705/37 |
| 2002/0082958 A1* | 6/2002 | Cooley et al. | 705/29 |
| 2002/0082959 A1* | 6/2002 | Barnard et al. | 705/29 |
| 2002/0169697 A1* | 11/2002 | Hicks et al. | 705/28 |
| 2002/0188524 A1* | 12/2002 | Shimizu | 705/26 |
| 2003/0041098 A1* | 2/2003 | Lortz | 709/203 |
| 2003/0055812 A1* | 3/2003 | Williams et al. | 707/1 |
| 2003/0126016 A1* | 7/2003 | Asano | 705/15 |
| 2003/0139982 A1* | 7/2003 | Schwartz et al. | 705/28 |
| 2004/0010454 A1* | 1/2004 | Helmolt et al. | 705/26 |
| 2004/0249727 A1* | 12/2004 | Cook, Jr. et al. | 705/27 |
| 2005/0125261 A1* | 6/2005 | Adegan | 705/4 |
| 2005/0125313 A1* | 6/2005 | Untiedt et al. | 705/28 |
| 2005/0187834 A1* | 8/2005 | Painter et al. | 705/28 |
| 2007/0299748 A1* | 12/2007 | Shorter et al. | 705/28 |
| 2008/0313058 A1* | 12/2008 | Budnik et al. | 705/28 |

OTHER PUBLICATIONS

Cox, Bob. Slimming Down Northrop Gumman hopes 'lean manufacturing' keeps it in shape for global competition. Fort Worth Star-Telegram ( Ft Worth , TX , US ) p. 12. dated Aug. 30, 1999.*

* cited by examiner

*Primary Examiner* — Scott Zare
(74) *Attorney, Agent, or Firm* — Kenyon & Kenyon LLP

(57) ABSTRACT

The present invention provides a system and method for identifying replacement parts. Replacement parts may be identified although they do not correlate to obsolete parts on a one-to-one basis. Both replaced parts and their substitutes may be tracked by, for example, associating an identifier with the part. Each identifier may be a string of characters that uniquely refers to the part. The identifier of the replaced part may be linked to an array of identifiers, each corresponding to a replacement part. A user may enter the identifier of the replaced part and retrieve data corresponding to each of the substitutes. During the lifecycle of the product, replacement parts may be replaced. Data may be retrieved showing a hierarchy describing a history of multiple replacements. The user need not know that a part has been replaced to retrieve re-designed or remanufactured part information.

12 Claims, 5 Drawing Sheets

•Item No. ABA130010 No Longer Available – Superceeded by items:

| •Material No. | Description | Quantity | Available? |
|---|---|---|---|
| ABA130010 | UNDERFRAME-FRONT END | 1 | No |
| ABB130050 | BULKHEAD-FRONT ASSY | 1 | Yes |
| ABD130330 | LEFT VALANCE FRONT ASSY | 1 | Yes |
| ABE100060 | LEFT SIDEMEMBER ASSY-FR | 1 | Yes |
| ABD130070 | RIGHT VALANCE FRONT ASSY | 1 | Yes |
| ABE100130 | RIGHTSIDEMEMBER ASSY-FR | 1 | Yes |

200

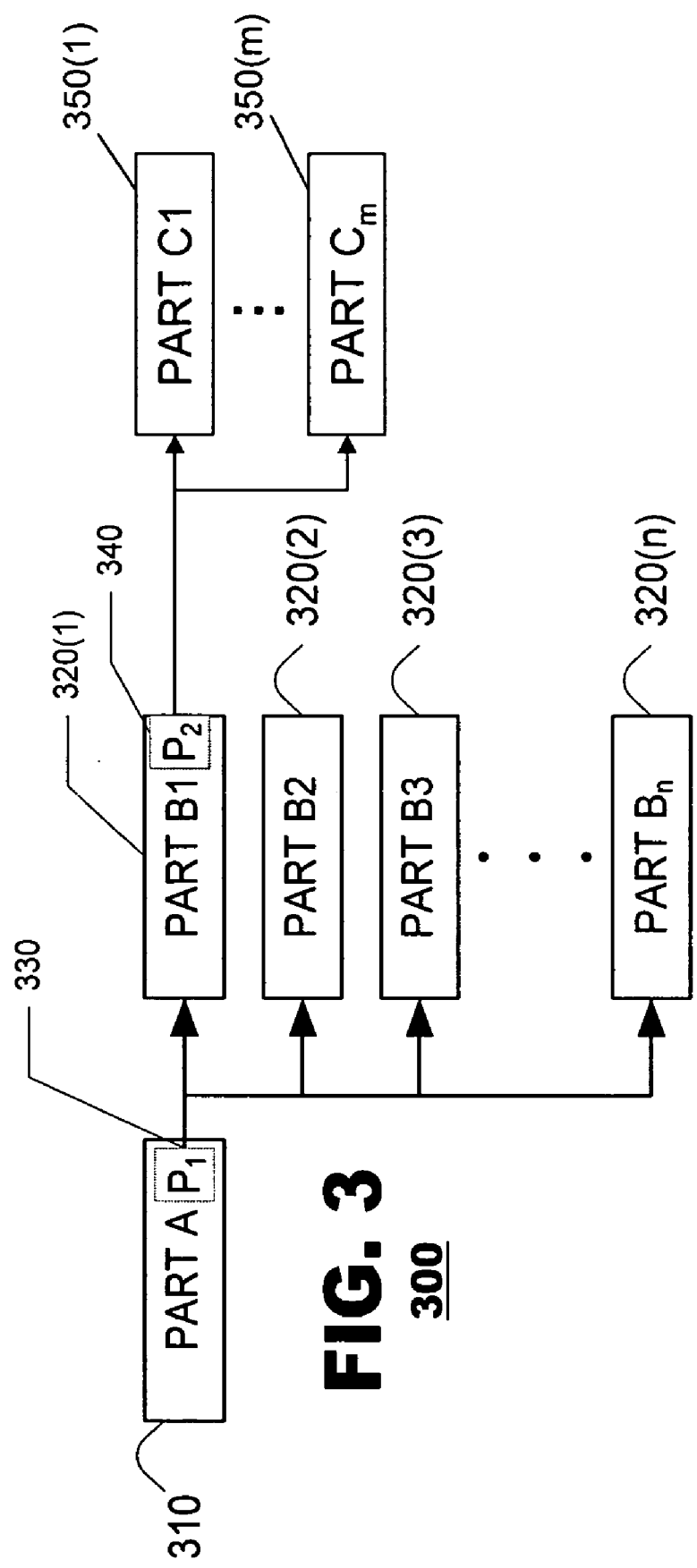

| ·Item No. | ·Description | ·Qty |
|---|---|---|
| ·1 | ·UNDERFRAME-FRONT END | ·1 |

·ABA130010

Fig. 4a

·Item No. ABA130010 No Longer Available – Superceeded by items:

| ·Material No. | Description | Quantity | Available? |
|---|---|---|---|
| ABA130010 | UNDERFRAME-FRONT END | 1 | No |
| ABB130050 | BULKHEAD-FRONT ASSY | 1 | Yes |
| ABD130330 | LEFT VALANCE FRONT ASSY | 1 | Yes |
| ABE100060 | LEFT SIDEMEMBER ASSY-FR | 1 | Yes |
| ABD130070 | RIGHT VALANCE FRONT ASSY | 1 | Yes |
| ABE100130 | RIGHTSIDEMEMBER ASSY-FR | 1 | Yes |

Fig. 4b

METHOD AND COMPUTER STORAGE MEDIUM FOR ORDERING A REPLACEMENT KIT TO BUILD SUPERSEDED PARTS

BACKGROUND

Companies may be involved in many commercial transactions, which may require tracking large amounts of data. For example, suppliers may supply goods that comprise a large number of parts. Information about these parts, such as tracking numbers and availability, may be recorded so that a supplier can ensure that parts are available for purchasers seeking maintenance or repair of purchased goods. Computer systems may be used to store and process recorded part data to improve efficiency and ease administration.

A manufacturer may redesign component parts of goods throughout the lifecycle of the product. Manufacturers are especially likely to redesign component parts of high value goods that are maintained by a purchaser for a long period and will be repaired rather than discarded and replaced. For example, an automobile manufacturer may redesign component parts of an automobile engine. In addition to redesigning components, a manufacturer may also "remanufacture" component parts by refurbishing parts that have been returned to the manufacturer. The manufacturer may substitute redesigned or remanufactured component parts for original component parts and discontinue selling the original component parts. Indeed, some replacement parts may be replaced themselves.

Each redesigned or remanufactured component part may be given its own part number so that replacement parts can be tracked separately from the part that they have replaced. So, when a product owner or service technician needs to order a component part, he or she may hold an obsolete product identifier for the product and may not be aware that the part has been replaced. Parts supersession software may track product replacements and assist operators who wish to identify new parts that have replaced old parts.

Conventional parts supersession software supports only one-to-one product replacements that retrieve information pertaining to a single replacement part when data relating to the obsolete part is provided. However, manufacturers may replace kits with component parts. For example, a car manufacturer may discontinue sale of car transmissions and offer component parts of the car transmission instead. What is needed is a system that can track one-to-many part supersession chains so that operators can identify replacement parts although the parts do not correlate with obsolete parts on a one-to-one basis.

BRIEF DESCRIPTION OF THE DRAWINGS

FIG. 3 depicts a part-to-replacement part linking data structure according to one embodiment of the invention.

FIG. 4a shows an order graphical user interface according to one embodiment of the present invention.

FIG. 4b shows an exploded one-to-many replacement part graphical user interface according to one embodiment of the present invention.

DETAILED DESCRIPTION

The present invention provides a system and method for identifying replacement parts. Replacement parts may be identified although they do not correlate to obsolete parts on a one-to-one basis. Both replaced parts and their substitutes may be tracked by, for example, associating an identifier with the part. Each identifier may be a string of characters that uniquely refers to the part. The identifier of the replaced part may be linked to an array of identifiers, each corresponding to a replacement part. A user may enter the identifier of the replaced part and retrieve data corresponding to each of the substitutes. During the lifecycle of the product, replacement parts may be replaced. Data may be retrieved showing a hierarchy describing a history of multiple replacements. The user need not know that a part has been replaced to retrieve re-designed or remanufactured part information.

Figure 1:
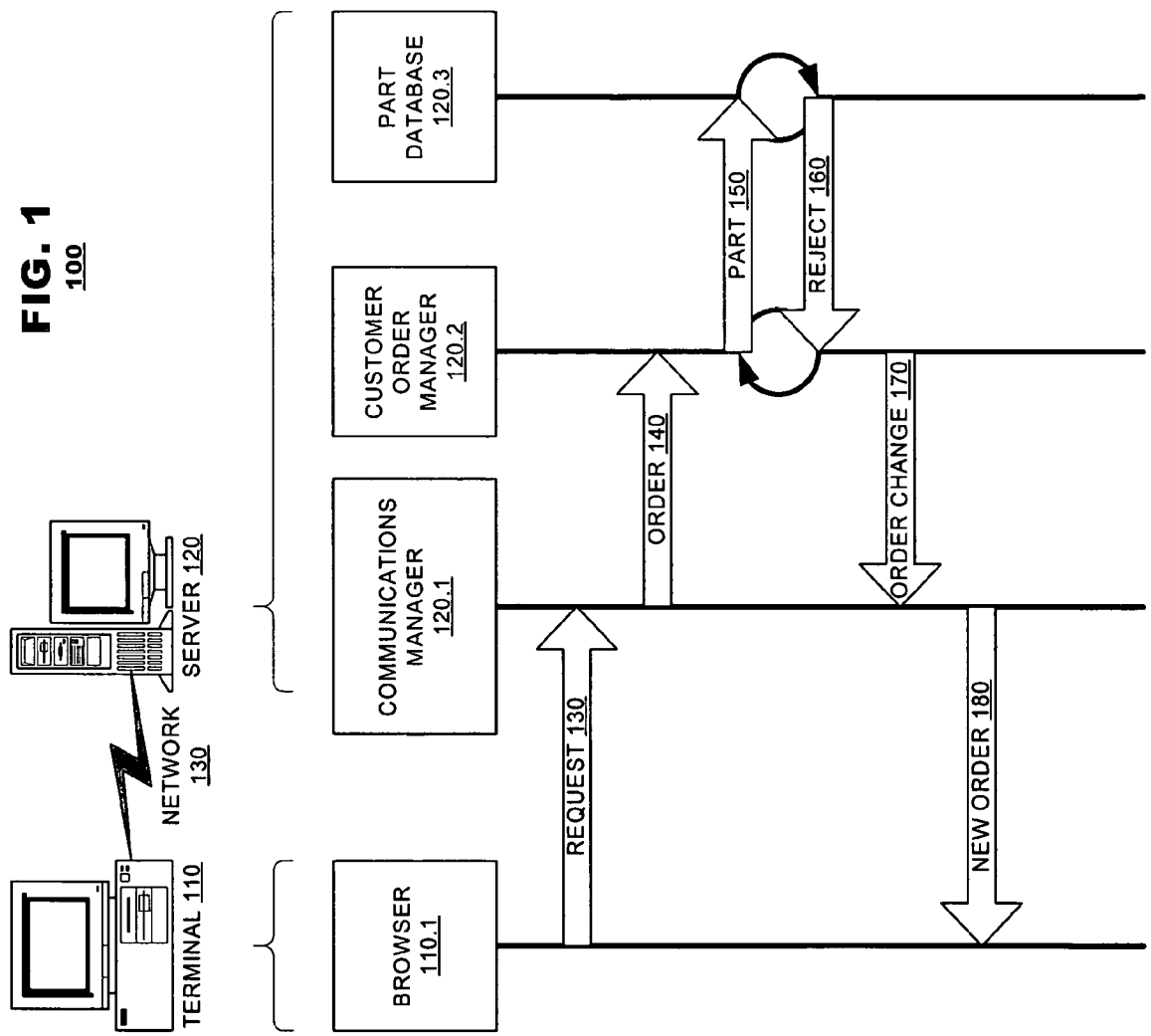
FIG. 1 illustrates a parts supersession system according to one embodiment of the invention.

FIG. 1 illustrates a parts supersession system 100 according to one embodiment of the invention. The parts supersession system 100 may comprise a terminal 110 that is connected to a server 120 via a communication network 130 to access a customer order application.

A product owner or service technician located at the terminal 110 may interact with an application that accepts customer orders. The application may reside in and be processed by the server 120. The application may be executable software that accepts information from an operator describing goods and/or services that are desired. The information may include component parts that a product owner or service technician wishes to purchase. The server 120 may be accessed via the communication network 130, which may be the Internet, a wired or wireless network. A variety of communication protocols and network topologies are known to support data related transactions; distinctions among them are immaterial for the purposes of the present discussion unless specifically cited. The communication network 130 may also be a single connection between terminal 110 and server 120. In an alternate embodiment of the invention, a single processor performs the functions of the terminal 110 and the server 120. In another alternate embodiment, the server 120 is a network comprising multiple servers and/or databases.

The terminal 110 may display one or more graphical user interfaces to a customer so that the customer can navigate through the customer order application, browse product offerings and select items for purchase. A browser 110.1 may display the graphical user interfaces and may allow the operator to browse available parts, as well as replacement parts. The browser 110.1 may be executable software that can receive data from an application, provide this data to a user and accept user input. The terminal 110 may be a device having an input and an output through which a customer can interact with the server 120 (e.g., a client computer having a graphical user interface (GUI) or a Web browser).

The application software may comprise a communications manager 120.1, a customer order manager 120.2 and a part database 120.3. In an alternate embodiment of the invention, the customer order manager 120.2 may reside in a customer relationship management (CRM) system and the part database 120.3 may reside in a supply chain management (SCM) system. The CRM system may provide customer relationship management functions such as storing data representing customer profiles, determining who has purchasing authority, and maintaining past order histories. Since the CRM system provides other customer management features, it may be desirable to handle separately part management functionality. Part management functionality may be performed instead by a SCM system that manages the chain of events that are performed to transfer products from suppliers to purchasers. A SCM system may support business scenarios such as inventory management, transportation procurement, distribution management and collaborative planning, forecasting and replenishment. The part database 120.3 may reside within the SCM system so that part management can be easily integrated with other supply chain management features.

The browser 110.1 may send data to and receive data from the communications manager 120.1. The communications manager 120.1 supports interactive exchanges with the operator located at the terminal 110. The communications manager 120.1 may provide graphical user interfaces and interpret input received from the terminal 110. The communications manager 120.1 may also convert the data into a signal that can be transmitted via the communication network 130, provide the proper handshaking, and convert received signals into data that can be processed by the customer order manager 120.2.

The customer order manager 120.2 may manage customer orders and fill orders received from an operator located at terminal 110. The customer order manager 120.2 may retrieve items from orders and send the retrieved data to the part database 120.3 to obtain information about whether the items requested are available. In the alternate embodiment of the invention described above, the CRM system may send the data to the SCM system so that the SCM system can determine part availability.

The part database 120.3 may store data that indicates which parts are available. The part database 120.3 may also store data indicating whether a part has been replaced and whether a kit has been fully or partially replaced by its components. During the lifecycle of a product, a replacement part may be replaced. The part database 120.3 may store data associated with these subsequent replacements. Replacement parts may be redesigned parts, remanufactured parts or other parts that may substitute in whole or in part for the original part. The part database 120.3 may store a description of each part and replacements, identification information, such as a part number, and availability information. The parts may be represented by objects. Objects representing parts that have been replaced may include links to objects representing replacement parts. A series of links may be used to track of series of replacements, e.g., when a replacement part is replaced by subsequent replacements.

A product owner or service technician may initiate the process by entering an address such as a Uniform Resource Locator (URL) of an entry point such as a home page of an application. A URL is an address that defines a route to a file on a World Wide Web (HTTP) server. The application may be an Internet sales application that provides customers with product and/or service offerings for purchase. The user will then be presented with the home page of the sales application and can navigate the sales application to browse product offerings. The user may then place a new order or review or modify an existing order.

In step 130, when a product owner or service technician creates or modifies an order, the browser 110.1 may transmit a message including the data that the user input into the order. Messages may be transmitted using an electronic messaging protocol such as Electronic Data Interchange (EDI), which may be used for large orders. Exemplary EDI protocols include American National Standards Institute (ANSI) X.12, UN/EDIFACT, and VDA/ODETTE. An EDI protocol may transfer data in files by synchronizing the time of transfer of the files between the system that is sending the data and the system that is receiving the data.

In step 140, the communications manager 120.1 receives the message and sends it to the customer order manager 120.2. The communications manager 120.1 may convert the incoming data to a format that can be understood by the customer order manager 120.2 and send the message to the customer order manager 120.2 prior to sending the message. If the communications manager 120.1 resides in an Internet sales application, the Internet sales application may support various other functions such as allowing users to browse products for purchase, track order status, and inquire about products. As an intermediate step, the Internet sales application may determine whether the user placed or changed an order or whether the customer selected another function instead. If the user placed or changed an order, the Internet sales application may then send the order to the customer order manager 120.2 or to the CRM system.

In step 150, the customer order manager 120.2 extracts data from the order and sends it to the part database 120.3 to obtain information about part availability. For example, the customer order manager 120.2 may extract a part order number from the order and send it to the part database 120.3. In the alternate embodiment described above, the CRM system sends the extracted data to the SCM system.

Upon receipt of data describing the requested part, the part database 120.3 or the SCM system may compare the received data to data describing available and replacement parts. If the requested part is a kit that has been replaced by its component parts, the part database 120.3 or the SCM system may respond to the customer order manager 120.3 or the CRM system with a modified order or may allow the customer to cancel the order and place another order. The initial order may specify whether supersession is allowed. If supersession is allowed, the replacement part number may be automatically substituted without further authorization by the operator.

In step 170, if supersession was not prohibited, a new order will be sent from the customer order manager 120.2 or CRM system to the communications manager 120.1. In step 180, the communications manager 120.1 sends the new order to the browser 110.1. If the user allowed supersession in the initial order, the new order may be finalized and include, for example, a shipment date. Otherwise, the customer may be required to approve of the new order prior to finalizing the order and setting a shipment date.

Figure 2:
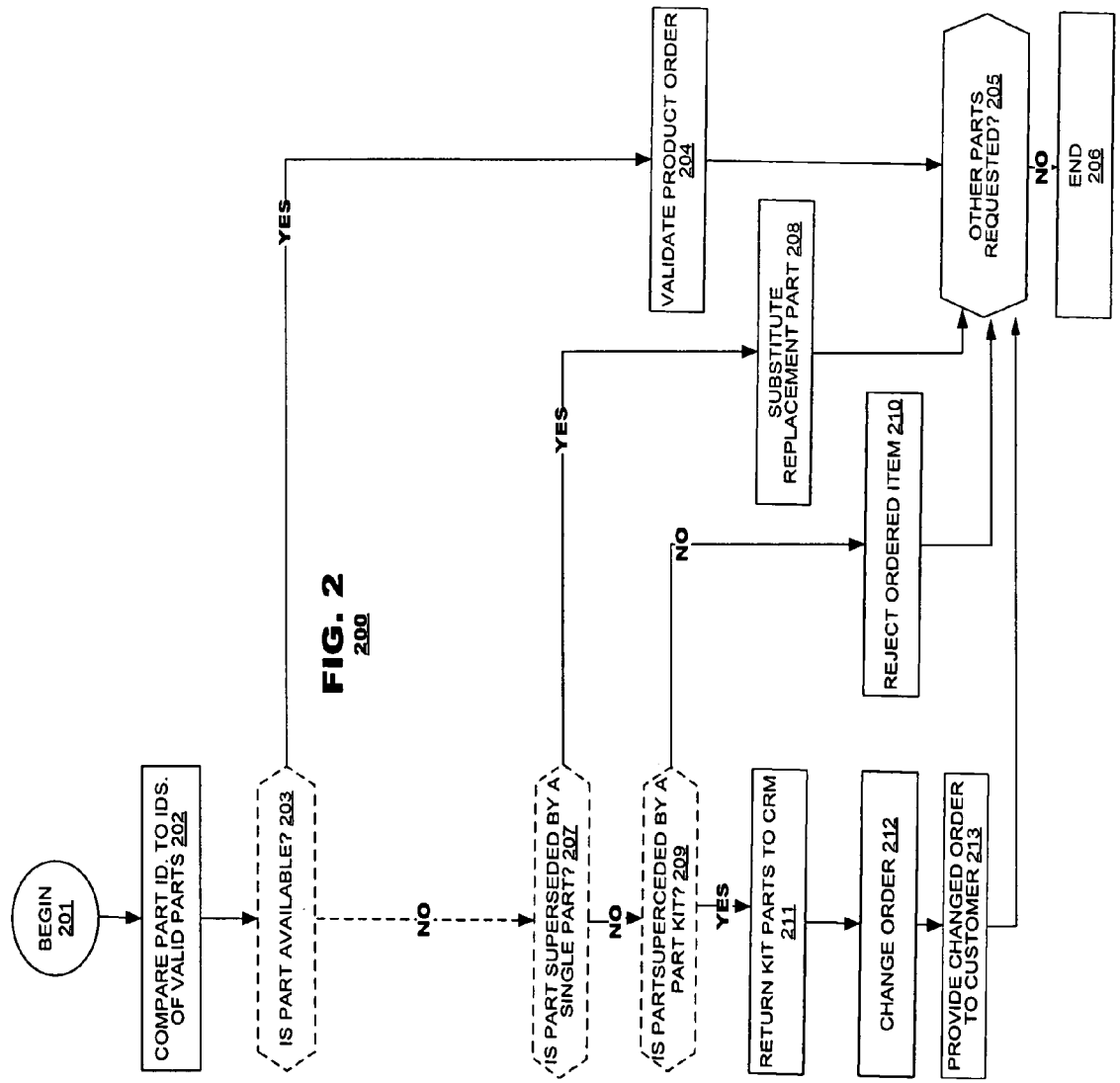
FIG. 2 illustrates a replacement parts identification process flow diagram according to one embodiment of the invention.

FIG. 2 illustrates a replacement parts identification process flow diagram 200 according to one embodiment of the invention. The replacement parts identification process is initiated when part data is extracted from the order. In step 202, extracted part identification data is compared to identification data of parts retrieved from the part database 120.3. Identification data may include information that identifies the type of part that was requested, such as a string of characters representing a part number, product number, model number, product code or another identifier. An object may be stored representing each type of part. The object may store part identification data, a description of the type of part, the price and other data that may be associated with the part. For example, for an assembly frame, a part number, such as AF-1000, a description, such as "automobile assembly frame" may be stored as well as the price, such as $1000. The identification data extracted from the order, e.g., FE-1000 may be compared to each of the stored identifiers corresponding to available or replaced parts, e.g., AA-0000 through ZZ-9999 to determine if there is a match.

The requested part may correspond to a kit that has been replaced by component parts. Step 209 is reached if the received part information does not correspond to a single available or replaced part. In step 209, a determination is made of whether the part corresponds to a kit. The object retrieved from the database may include one or more links that specify one or more replacement parts. For example, a front-end kit with part number FE-1000 may be replaced by an under-frame, with a part number LL-1000, a bulkhead front assembly, with a part number LL-1001, a left side-member front assembly, with part number LL-1002 and a right side-member front assembly with part number LL-1003. One of the replacement parts may even be replaced. For example, the under-frame, part number LL-1000, may be replaced by a front under-frame assembly, part number LL-2000 and a rear under-frame assembly, part number LL-2001. A pointer may be stored in the object representing the replaced front-end part, FE-1000 that points to an array of pointers, each pointing to the components (with part numbers LL-1000 through LL-1003) that together replace the front-end part. A pointer may be stored with the object representing the under-frame, part number LL-1000, that points to an array of pointers, each pointing to the components (with part numbers LL-2000 and LL-2001) that together replace the under-frame. Since in this example, the object with the part identifier FE-1000 links to multiple other objects representing multiple replacements, the received part identification data, FE-1000, corresponds to a kit. If the received part does not correspond to either a kit or a single part, processing may proceed to step 210 and the ordered item will be rejected.

Step 211 is reached if the received part information corresponds to a kit. In step 211 components of the kit, or kit parts, are returned to the user. If the object stored by the part database 102.3 includes pointers to objects representing components that replace the kit, the replacement components may be retrieved from these links. Subsequent replacements may be retrieved by additional links to objects representing later replacements.

In step 212, a change order is created with the information describing the components that were retrieved from the part database 102.3. The replacement components are substituted for the kit that was ordered. If the order did not include an indication of whether substitution is authorized, the system may request that the customer agree to the modifications prior to finalizing the change. If substitution was authorized in the initial order, the modified order may then be finalized.

In step 213 the changed order is provided to the user. The user is notified and the customer may be asked to accept modifications.

Initial steps may be performed to determine whether a part is available or is replaced by a single part. For example, in step 203, a determination may be made of whether a part is available. Part availability information may be stored with the object representing the product. In the example above, if an automobile front-end has been replaced, an object may be stored with a part number, such as FE-1000, a description, such as "front-end," and a price such as $3000. Additionally, availability information such as a date that the part may be shipped or an indicator that the part is no longer sold may be stored with this object. If the part is available, processing proceeds to step 204. In step 204, the product order is validated. The processing proceeds to step 205 to determine if processing should continue for another part.

Step 207 is reached if the ordered quantity is not available. In step 207, a determination may be made as to whether the part is superseded by a single part. Each object representing a replacement part may indicate whether the part that is represented corresponds to a single part or a kit. For example, if the link includes only a single part identifier, the requested part has been replaced by a single part. A customer may define rules for determining whether a part has been replaced by one or more substitute products when the ordered quantity is not available.

Step 208 is reached if the received part information corresponds to a single replacement part. In step 208, the replacement part is identified and substituted in the order. If the order did not include an indication of whether substitution is authorized, the modified order may be confirmed by the customer prior to finalizing the change. If substitution was authorized in the initial order, the modified order may then be finalized.

Step 205 is reached following steps 204, 208, 210 and 213. In step 205, a determination is made of whether other parts were included in the order. The customer order manager 120.2 or the supply chain management system attempts to extract another part from the order. If the order does not include other parts, the order with modifications, if made, is presented to the user by, for example, a graphical user interface.

FIG. 3 depicts a part-to-replacement part linking data structure according to one embodiment of the invention. Products may be represented by objects 310 and 320(1)-320(n). An object 310 may represent a product that has been replaced, e.g., Part A. Other objects 320(1)-320(n) may represent other products, e.g., Part B1-$B_n$ that are substitutes for the replaced product. The object 310 may include a supersession pointer $P_1$ 330, which may be an array having multiple values that may point to those other objects 320(1)-320(n) that represent products that are components of the replaced kit. Additional hierarchies are possible. For example, a second pointer $P_2$ 340 stored with one of the objects 320(1) through 320(n) may point to another array of objects 350(1)-350(m) that represent products that subsequently replaced a replacement product. For example, an object 310 may represent a front-end kit with part number FE-1000 and may have a supersession pointer 330 that points to other objects 320(1)-320(4) that represent products that replace the front-end kit, e.g., an under-frame, with a part number LL-1000, a bulkhead front assembly, with a part number LL-1001, a left side-member front assembly, with part number LL-1002 and a right side-member front assembly with part number LL-1003. The object 320(1) may represent the under-frame and may have a pointer $P_2$ 340 that points to an array of objects 350(1)-350(2) representing products (LL-2000 and LL-2001) that later replaced the under-frame.

Data describing replacement products may be retrieved because the supersession pointer 330 links the replacement components to the replaced part. A user need not know that a part has been replaced. By entering identification information for a kit, substitute components corresponding to that kit are retrieved from the storage location pointed to by the array of pointers comprising the supersession pointer 330.

FIG. 4a shows an order graphical user interface 400 according to one embodiment of the present invention. An operator may place an order for an item such as an under-frame front-end for an automobile. The operator may enter a material number, such as "ABA130010" and the quantity of items requested, e.g., 1. This order is sent from the browser 101.1 to the communications manager 120.1.

FIG. 4b shows an exploded one-to-many replacement part graphical user interface 401 according to one embodiment of the present invention. The exploded one-to-many replacement part graphical user interface may be provided in response to the order illustrated in FIG. 4a. It may indicate that the requested part is no longer available by, for example, a message indicating that the requested part has been superseded, displaying an indented list of replacement parts and/or displaying with each replacement part an indication that the part replaces the line item corresponding to the requested part. The graphical user interface may also display replacement parts such as a bulkhead-front assembly, left valance front assembly, left sidemember assembly frame, right valance front assembly, and right sidemember assembly frame. The graphical user interface may also display the material numbers associated with the replacement parts, as well as a quantity of each part. If the user indicated that substitute parts are acceptable, this order may be confirmed. Otherwise, the customer may be prompted to accept the substitution.

The exploded one-to-many replacement part graphical user interface 401 may also display other data pertaining to the order including an order number, price of each replacement item, delivery address, delivery date, and delivery status.

Figure 5:
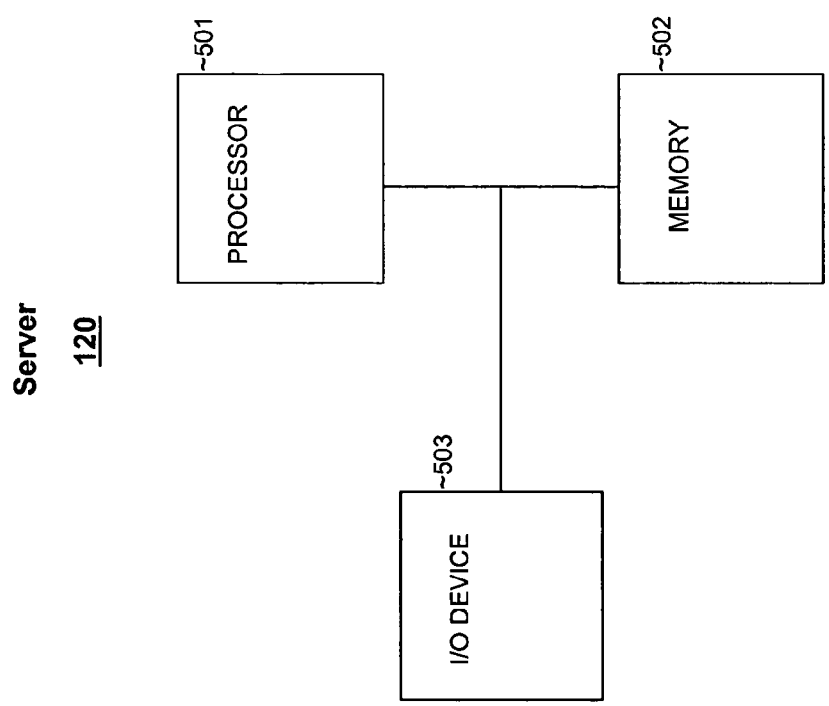
FIG. 5 shows a structure of a server according to one embodiment of the invention.

FIG. 5 shows a structure of a server 120 according to one embodiment of the invention. The server 120 includes a processor 501, memory 502, and an input/output (I/O) device 503. The processor 501 is connected to the memory 502. The processor 501 is also connected to the I/O device 503. These connections are direct or via other internal electronic circuitry or components.

The processor 501 may be a programmable processor that executes instructions residing in memory 502 to receive and send data via the I/O device 503 including a programmable microprocessor or combination of microprocessors or processors that can operate on digital data, which may be special or general purpose processors coupled to receive data and instructions from, and to transmit data and instructions to, a machine-readable medium. According to one embodiment of the present invention processor 501 is an Intel microprocessor.

Memory 502 may be a machine-readable medium that stores data that is processed by the processor 501 including a computer program product, apparatus and/or device (e.g., a random access memory (RAM), read only memory (ROM), magnetic disc, optical disc, programmable logic device (PLD), tape, or a combination of these devices). This may include external machine-readable mediums that are connected to the processor 501 via the I/O device 503.

The I/O device 503 may be a coupling that receives and/or sends digital data to and from an external device.

Various implementations of the systems and techniques described here can be realized in a processing systems and/or digital electronic circuitry, integrated circuitry, specially designed ASICs (application specific integrated circuits), computer hardware, firmware, software, and/or combinations thereof.

A number of embodiments of the invention have been described. Nevertheless, it will be understood that various modifications may be made without departing from the spirit and scope of the invention.

What is claimed is:

1. A computer-implemented method for identifying replacement products comprising:
  receiving, by a processor, a message from an operator in a first format;
  converting, by the processor, the message into a second format;
  retrieving, by the processor, from the converted message an order, wherein the order includes a new order or a modification of an existing order;
  extracting, by the processor, data from the order the data comprising information identifying an ordered item, wherein the ordered item is a single item;
  comparing, by the processor, the extracted data to identifiers of stored product objects in a product database;
  upon identification of a match, retrieving, by the processor, a first product object that corresponds to the ordered item;
  identifying, by the processor from data of the first product object, that the first product object cannot be returned in response to the order because the first product object is no longer available as a single item;
  extracting, by the processor from the first product object, an array of pointers to other product objects in the database, the other product objects representing distinct products that together comprise a replacement kit for the ordered item represented by the first product object, wherein the array of pointers identify a one-to-many part supersession;
  wherein the replacement kit includes all assembly parts of the ordered item wherein the assembly parts are capable of being assembled to build the ordered item;
  based on the array of pointers, retrieving, by the processor from the other product objects, descriptions of the multiple distinct replacement products when combined together substitute for the ordered item; and
  rewriting, by the processor, the order to replace submitted data describing the ordered item with retrieved data describing the multiple distinct replacement products.

2. The method of claim 1, wherein the order specifies whether the operator will accept substitute products and the rewritten order is automatically finalized without further acceptance by the operator.

3. The method of claim 2, wherein the operator need not approve a modified order including substitute products after providing initial authorization allowing substitution.

4. The method of claim 1, wherein the replacement kit and the multiple distinct replacement products are each represented by an object.

5. The method of claim 1, wherein the descriptions of the multiple distinct replacement products are retrieved by accessing storage pointed to by the array of pointers, each pointer corresponding to one of said multiple distinct replacement products.

6. The method of claim 1, wherein one of the multiple distinct replacement products has been replaced by a second replacement product and the rewritten order comprises retrieved data describing the second replacement product.

7. A computer readable storage medium storing a set of instructions that when executed by a processor perform a method comprising:
  receiving, by a processor, a message from an operator in a first format;
  converting, by the processor, the message into a second format;
  retrieving, by the processor, from the converted message an order, wherein the order includes a new order or a modification of an existing order;
  extracting, by the processor, data from the order the data comprising information identifying an ordered item, wherein the ordered item is a single item;
  comparing, by the processor, the extracted data to identifiers of stored product objects in a product database;
  upon identification of a match, retrieving, by the processor, a first product object that corresponds to the ordered item;

identifying, by the processor from data of the first product object, that the first product object cannot be returned in response to the order because the first product object is no longer available as a single item;

extracting, by the processor from the first product object, an array of pointers to other product objects in the database, the other product objects representing distinct products that together comprise a replacement kit for the ordered item represented by the first product object, wherein the array of pointers identify a one-to-many part supersession;

wherein the replacement kit includes all assembly parts of the ordered item wherein the assembly parts are capable of being assembled to build the ordered item;

based on the array of pointers, retrieving, by the processor from the other product objects, descriptions of the multiple distinct replacement products when combined together substitute for the ordered item; and rewriting, by the processor, the order to replace submitted data describing the ordered item with retrieved data describing the multiple distinct replacement products.

8. The computer readable storage medium of claim 7, wherein the order specifies whether the operator will accept substitute products and the rewritten order is automatically finalized without further acceptance by the operator.

9. The computer readable storage medium of claim 8, wherein the operator need not approve a modified order including substitute products after providing initial authorization allowing substitution.

10. The computer readable storage medium of claim 7, wherein the replacement kit and the multiple distinct replacement products are each represented by an object.

11. The computer readable storage medium of claim 7, wherein the descriptions of the multiple distinct replacement products are retrieved by accessing storage pointed to by the array of pointers, each pointer corresponding to one of said multiple distinct replacement products.

12. The computer readable storage medium of claim 7, wherein one of the multiple distinct replacement products has been replaced by a second replacement product and the rewritten order comprises retrieved data describing the second replacement product.

* * * * *